United States Patent [19]

Krause

[11] 4,428,208
[45] Jan. 31, 1984

[54] OIL CONTROL SYSTEM AND REGULATOR

[75] Inventor: Richard J. Krause, Addison, Ill.

[73] Assignee: AC&R Components, Inc., Melrose Park, Ill.

[21] Appl. No.: 341,280

[22] Filed: Jan. 21, 1982

[51] Int. Cl.³ .................... F25B 31/00; F16K 31/18; F01M 11/12
[52] U.S. Cl. ...................................... 62/192; 62/468; 137/426; 137/440; 184/103 A; 417/228
[58] Field of Search .................. 62/192, 468, 84, 469, 62/125, 194; 137/426, 440, 434, 448, 446, 438; 417/228; 418/84; 184/103 A

[56] References Cited

U.S. PATENT DOCUMENTS

| 518,527 | 4/1894 | Kolliker | 137/426 |
|---|---|---|---|
| 1,992,900 | 2/1935 | McIntosh | 62/194 |
| 2,517,464 | 8/1950 | Corcoran | 137/426 X |

FOREIGN PATENT DOCUMENTS

| 742365 | 3/1933 | France | 137/426 |
|---|---|---|---|
| 467429 | 6/1937 | United Kingdom . | |
| 2042087 | 9/1980 | United Kingdom . | |

OTHER PUBLICATIONS

*Compressor Protective Devices*, DCI Vender No. 681016, A.C.&R. Components, Inc., Catalog 9, (cover sheet & p. 9).

*Sporlan Oil Level Control System*, (4 pp.), Sporlan Valve Company, St. Louis, Mo., copyright 1979.

*Primary Examiner*—Albert J. Makay
*Assistant Examiner*—Harry Tanner
*Attorney, Agent, or Firm*—Lockwood, Dewey, Alex & Cummings

[57] ABSTRACT

An oil control system and regulator for controlling the oil level in the crankcase of one or more refrigeration compressors or the like are disclosed. The regulator comprises a shell and end cap closures defining a closed chamber for containing the oil. An inlet extends through one of the end cap closures and includes a float controlled valve for admitting liquid to the chamber as necessary to maintain the oil level in the chamber and compressor crankcases and also includes a piston which is movable up and down to adjust the float and the oil level in the regulator chamber. A threaded adjusting pin extends through the end cap closure and into the chamber and threads on the adjusting pin are threaded through a coupling bracket which couples the pin with the piston to move the piston, float and valve for adjusting the oil level.

10 Claims, 4 Drawing Figures

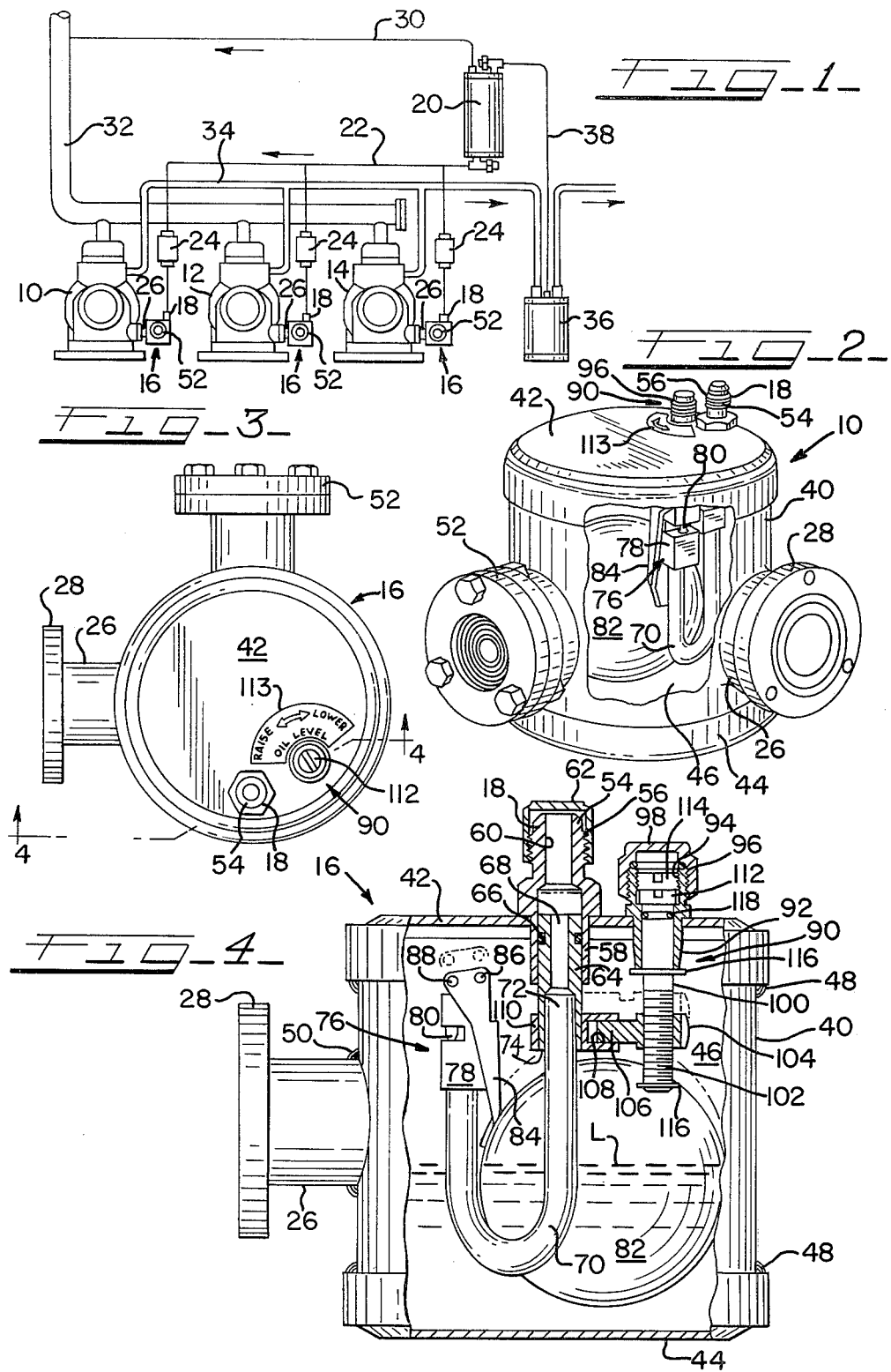

OIL CONTROL SYSTEM AND REGULATOR

BACKGROUND AND SUMMARY OF THE INVENTION

The present invention relates to a liquid control system and regulator therefor and, more particularly, to an oil control system and regulator for controlling the oil level in the crankcase of a compressor.

Oil level control systems and regulators have been employed in the past for controlling the oil level in the crankcase of one or more compressors, such as refrigeration compressors. By way of example, a prior oil level control system for refrigeration compressors and regulators for the system are shown in U.S. Pat. No. 2,246,244 to J. C. Consley.

The oil level regulator shown in the aforementioned patent employs a float valve and a regulator is mounted to the exterior of each of the compressor crankcases to maintain the level of oil in the crankcase sumps at a predetermined level. However, it is frequently desirable that the oil level in the regulator and the crankcase sump to which it is connected be capable of adjustment within predetermined oil level limits. The oil regulator disclosed in the aforementioned patent is not adjustable.

The oil level control system and regulator incorporating the principles of the present invention is capable of maintaining the oil level in one or more compressor crankcase sumps and is also capable of rapid and easy adjustment to vary the level of oil as may be desired. Moreover, not only is the oil level control system and regulator of the present invention capable of oil level adjustment, but such adjustment may be done while oil is flowing through the system without the need to shut down the system to accomplish the adjustment. Thus, adjustment is expedited and may be accomplished at any time. The oil level control system and regulator incorporating the principles of the present invention is simple in construction and requires only simple, widely available tools to accomplish the adjustment. Moreover, once the adjustment of the system and regulator of the present invention is complete, the regulator may be locked so as to avoid accidental or inadvertent changes in the adjustment.

In one principal aspect of the present invention, a liquid level regulator includes a closed chamber for containing the liquid, inlet means for admitting liquid to the chamber and discharge means for discharging liquid from the chamber. Valve means is included in the inlet means and float means in the chamber is connected to the valve means for opening and closing the valve means in response to the level of the liquid in the chamber. Adjustment means adjusts the elevation of the float means to adjust the level of liquid in the chamber and the adjustment means is operable from the exterior of the chamber and while the liquid is being admitted through the inlet means.

In another principal aspect of the present invention, the aforementioned liquid level regulator includes movable piston means and the float means and adjustment means are coupled to the piston means such that when the adjustment means is adjusted, the piston means moves to adjust the elevation of the float means.

In still another principal aspect of the present invention, the last mentioned piston means is part of the inlet means and the liquid entering the chamber from the inlet means passes through the movable piston means to the valve means.

In still another principal aspect of the present invention, the aforementioned liquid level regulators include, in combination therewith, a compressor having a crankcase for lubricating oil for the compressor. The discharge means discharges to the crankcase and the liquid level regulator maintains the level of the oil in the crankcase. A lubricating oil reservoir is also included and the inlet means communicates with the reservoir.

These and other objects, features and advantages of the present invention will become more readily understood upon a consideration of the following detailed description.

BRIEF DESCRIPTION OF THE DRAWING

In the course of this description, the drawing will frequently be referred to in which:

FIG. 1 is an overall schematic view of a compressor oil level control system with regulators incorporating the principles of the present invention;

FIG. 2 is an enlarged, partially broken, perspective view of one of the oil level regulators incorporating the principles of the present invention;

FIG. 3 is a plan view of the regulator shown in FIG. 2; and

FIG. 4 is a broken, cross sectioned, side elevational view of the oil regulator as viewed substantially along line 4—4 of FIG. 3.

DESCRIPTION OF THE PREFERRED EMBODIMENT

An overall schematic view of a preferred embodiment of oil level control system and regulator incorporating the principles of the present invention is shown in FIG. 1.

The system comprises a plurality of compressors 10, 12 and 14 which may, for example, be refrigeration compressors. Each of the compressors has a crankcase sump (unnumbered) for containing the lubricating oil for the compressors. Each of the compressor crankcase sumps also includes an oil level regulator 16 for controlling the level of the oil in each of the sumps at a desired level.

Each of the regulators 16 includes an inlet 18 through which oil is admitted to the regulator and its associated sump from an oil reservoir 20, conduits 22 and filters 24. The oil regulators 16, as previously mentioned, communicate directly with the compressor crankcase sumps by way of a short discharge conduit 26 which is mounted to the exterior of the crankcase by suitable means, such as a gasketed, flanged mounting 28 as shown in FIGS. 2-4.

The reservoir 20 is preferably vented via a conduit 30, as shown in FIG. 1, to the compressor fluid inlet 32 which, in the case of refrigeration compressors, is the refrigerant inlet to the compressors. The vent 30 serves to relieve pressure in that portion of the system.

The compressed fluid discharge from each of the compressors 10, 12 and 14 is discharged through a conduit 34, preferably to an oil separator 36, where any lubricating oil which may be entrained in the compressed fluid is separated and returned, via conduit 38, to the oil reservoir 20.

The system thus far described is essentially known in the prior art and is described in the aforementioned Letters Patent.

Turning now to the detailed description of the preferred embodiment of oil level regulator incorporating the principles of the present invention, the regulator 16 preferably comprises a hollow cylindrical shell 40 which is closed at its ends by an upper end cap closure 42 and a lower end cap closure 44 to define a liquid containing chamber 46 in the regulator 16. The end caps 42 and 44 may be affixed to the shell 40 by any suitable means, for example by soldering or welds 48 as shown in FIG. 4.

The discharge 26 from the chamber 46 to the compressor crankcase sump extends through the shell 40 and is affixed thereto by suitable means, such as welds 50. In addition, a suitable flanged sight glass 52, as shown in FIGS. 1-3, is mounted to the shell 40 in the same manner as the discharge 26 to communicate with the chamber 46 and enable the visual sighting of the level of oil in the chamber 46 from the exterior of the regulator 16. Such viewing is not only generally advantageous for monitoring the oil level in the regulators and crankcase sumps during normal system operation, but is also particularly advantageous for performing adjustment of the oil level L as will be described in more specific detail to follow.

The oil inlet 18 to the reservoir preferably comprises a suitable threaded fitting 54 having threads 56 on its outer end for adapting the fitting to be coupled with conduit 22 as shown in FIG. 1. The fitting 54 extends through end cap closure 42 into chamber 46 and terminates in a cylindrical, piston receiving end 58 as shown in FIG. 4. The fitting 54 is centrally bored to provide an oil flow passage 60 as shown in FIG. 4. For purposes of protecting against the ingress of contaminants during shipping and storage, a protector cap 62 as shown in FIG. 4 may be inserted on the fitting 54 and removed at the time the regulator is to be coupled to conduit 22.

The inlet structure of the preferred embodiment of regulator of the present invention also includes an elongate piston 64 which is slidable in the cylinder 58 of fitting 54 as shown in FIG. 4. The piston 64 preferably includes one or more O-ring seals 66 on its exterior to seal the piston against leakage between the piston and the cylinder. The piston 64 is also bored to provide a passage 68 through the piston for the oil to flow through the piston from the passage 60 of fitting 54 to a conduit 70, the latter of which is bent in the form of a U. One end 72 of the U-shaped conduit is fitted into the bottom 74 of the piston and held there by suitable means, such as a soldered joint.

The other end of the U-shaped conduit 70 has a valve 76 mounted thereon as shown in FIGS. 2 and 4. The valve 76 comprises a stationary valve seat structure 78 which may be secured by a soldered joint to the end of the U-shaped conduit 70, and a float valve needle 80 which moves toward and away from the valve seat to control the inflow of oil in response to action of a float 82.

The float 82 is a ball float which is connected by a suitable float lever 84 to a pivot mounting at the top of the valve 76. The pivot mounting includes a pair of pivot pins 86 and 88. One of the pivot pins 86 is coupled to the stationary portion of the valve seat housing 78 to allow pivoting of the float lever 84 about that housing which is stationary relative to the U-shaped conduit 70. The other pin 88 is pinned through the float valve needle 80 to move the needle up and down in response to the level L of oil in the chamber 46 and movement of the float 82 as the level changes.

As previously mentioned, the oil level L in the regulator 16 of the present invention may be readily adjusted from the exterior of the regulator. Such adjustment is accomplished by an adjustment assembly, generally 90, as shown in FIGS. 2-4.

The adjustment assembly comprises a tubular body 92 which also extends through end cap closure 42 as shown in FIGS. 2-4. The body 92 is preferably fixed to the end cap closure 42 by suitable means, such as a soldered joint. The exterior end of the tubular body 92 preferably includes internal threads 94 and external threads 96. The external threads 96 are adapted to receive a suitable protective cap 98 to avoid inadvertent movement of the adjustment assembly after adjustment has been completed and during normal operation of the regulator.

An adjustment pin 100 extends through the body 92, as shown in FIG. 4, and into the chamber 46. The adjustment pin 100 has an elongate threaded end 102 which extends into the chamber 46 and through a threaded adjustment coupling bracket 104 in the chamber 46. The adjustment coupling bracket 104 includes an end 106 which extends laterally into an opening 108 in a second adjust coupling bracket 110. Bracket 110 is rigidly fixed, such as by a soldered joint, to the piston bottom 74 so that when the brackets 104 and 110 are moved up or down by the threads on pin 100, the piston 64 moves with the brackets. The end 106 of bracket 104 loosely fits into opening 108 on bracket 110 to allow some play to exist between the brackets 104 and 110 during adjustment. Although brackets 104 and 110 are shown as separate, interfitted elements, they may be formed integrally with each other.

The top of the pin 100 preferably comprises a slotted head 112 for receiving a standard screwdriver to allow the pin 100 to be turned to adjust the oil level L in the chamber 46. The threads 102 on pin 100 are preferably of a hand so that the float 82 is lowered when the head 112 is turned in the direction in which a screw is normally turned to screw down and is raised when turned in the opposite direction. If desired, a label 113 may also be provided, as shown in FIGS. 2 and 3, adjacent the adjustment assembly and on the end cap closure 42 as a guide to the person making the adjustment. A threaded safety plug 114 may also be provided to lock the pin 100 in its desired adjustment position to prevent undesired changes in the adjustment due to vibration or the like during normal operation. Plug 114 may also be screwed into a position to lock head 112 by the internal threads 94 in body 92 using a standard screwdriver.

The pin 100 also preferably includes upper and lower snap rings 116 to limit the range of adjustment of the regulator and an O-ring 118 to prevent leakage. The O-ring allows adjustment under line pressure. The upper snap ring 116 and the head 112 prevent vertical movement of the pin 100. The pin 100 merely turns to cause rotation of the threads 102.

After considering the foregoing description of the preferred system and regulator incorporating the principles of the present invention, the operation thereof and the manner of adjustment should be evident. However, a brief description of the operation and manner of adjustment will be set forth as follows.

Oil will enter the regulator 16 from the oil reservoir 20 through conduit 22, filter 24 and inlet 18. The oil flows through passage 60 in the threaded fitting 54, passage 68 in piston 64, and conduit 70 to the valve seat 78. If the oil level L in chamber 46 and the crankcase sump is at its desired level, the float 82 will be buoyed upwardly to move the float valve needle 80 downward to close the valve and no oil will flow into the chamber 46. The oil level L is preferably maintained at a level above the bottom of the discharge 26, because the oil in the chamber 46 should be at the same level as the oil in the crankcase of its respective compressor 10, 12 or 14 to which the regulator 16 is mounted.

If the oil level drops below this desired level, the float 82 will also drop, opening the inlet valve 76 by raising the float valve needle 80 to allow oil to enter the chamber 46.

If it is desired to change the oil level L in chamber 46 to, for example, raise the level, the protective cap 98 is removed along with the safety plug 114. The level adjustment is then made by turning the pin 100 with a screwdriver so as to raise coupling bracket 104 and its complementary coupling bracket 110. This causes the piston 66 to move upwardly, raising its attached U-shaped conduit 70, valve 76, lever arm 84 and float 82. Once the desired float elevation is reached, the safety plug 114 is reinstalled, as well as the protective cap 98.

Lowering the oil level L and float 82 is accomplished in the same manner as just described, except that the pin 100 is turned in the opposite direction.

It will be seen that the oil level adjustment may be readily accomplished without securing oil to the inlet 18. This is advantageous because the adjustment may be rapidly and easily accomplished and may be done at any time without the need to shut down the system. As the float 82 is raised, oil will instantly enter the chamber 46 to give an immediate indication of the new operating level L. This level may be viewed and monitored continuously through the sight glass 52 during adjustment so that the person making the adjustment knows at all times just what the current adjusted level is. Conversely, if the oil to inlet 18 would have to be secured during adjustment, the adjustment becomes substantially more complicated and time consuming because it must be accomplished in steps while turning on and off the oil to determine the current status of adjustment of the level L.

It will be understood that although the preferred embodiment of the present invention has been described in terms of adjustment in the oil level in the crankcase sumps of refrigeration compressors, the invention may find other uses by those skilled in the art.

It will also be understood that the preferred embodiment of the present invention which has been described is merely illustrative of only a few of the principles of the present invention. Numerous modifications may be made by those skilled in the art without departing from the true spirit and scope of the present invention.

What is claimed is:

1. A liquid level regulator for regulating the oil level in a crankcase sump, comprising:

a closed chamber for containing the liquid, inlet means including a cylinder for admitting liquid to said chamber, discharge means for discharging liquid from said chamber to the sump, piston means slidably movable in said cylinder and contained substantially entirely within said chamber and having a passage therein through which the liquid entering the chamber from said inlet means passes, valve means in said inlet means for receiving the liquid from said piston means, float means in said chamber connected to said valve means for opening and closing said valve means in response to the level of liquid in said chamber, said float means being mounted to said piston means for movement with said piston means to adjust the elevation of said float means when said piston means is slidably moved, and adjustment means for adjusting the elevation of said float means to adjust the level of liquid in said chamber, said adjustment means including rotatable means accessible from the exterior of said chamber for rotation thereof, and coupling means coupling said rotatable means to said pistion means in said closed chamber such that rotation of said rotatable means slidably moves said piston in said cylinder and said float means in elevation while liquid is being admitted through said inlet means.

2. The liquid level regulator of claim 1 wherein said chamber is defined by a shell and closure means at each end of said shell, said adjustment means extending through one of said closure means into said chamber.

3. The liquid level regulator of claim 2 wherein said inlet means also extends through the same closure means as said adjustment means.

4. The liquid level regulator of claim 2 including sighting means in said shell for visually observing the liquid level in said chamber.

5. The liquid level regulator of claim 1 wherein said rotatable means comprises threaded means, and said coupling means is rigidly coupled to said piston means and also coupled to said threaded means, said threaded means linearly moving said piston means to adjust the elevation of said float means when said threaded means is threadedly moved relative to said coupling means.

6. The liquid level regulator of claim 1 wherein said valve means is also coupled to said movable piston means for movement therewith.

7. The liquid level regulator of claim 1 wherein said chamber is defined by a shell and closure means at each end of said shell, said rotatable means and said inlet means extending through one of said closure means into said chamber, said rotatable means comprising threaded means, and said coupling means being rigidly coupled to said piston means and valve means, and also coupled to said threaded means, said threaded means linearly moving said piston means to adjust the elevation of said float means when said threaded means is threadedly moved relative to said coupling means.

8. The liquid level regulator of claim 7 including sighting means in said shell for visually observing the liquid level in said chamber.

9. The liquid level regulator of claim 1 including, in combination therewith, a compressor having a crankcase for lubricating oil for the compressor, said discharge means discharging to said crankcase and said liquid level regulator maintaining the level of oil in said crankcase, and a lubricating oil reservoir, said inlet means communicating with said reservoir.

10. The liquid level regulator of claim 7 including, in combination therewith, a compressor having a crankcase for lubricating oil for the compressor, said discharge means discharging to said crankcase and said liquid level regulator maintaining the level of oil in said crankcase, and a lubricating oil reservoir, said inlet means communicating with said reservoir.

* * * * *